United States Patent [19]

Hiroshima

[11] Patent Number: 4,904,054

[45] Date of Patent: Feb. 27, 1990

[54] PROJECTION APPARATUS FOR PROJECTION TELEVISION RECEIVER

[75] Inventor: Yasunori Hiroshima, Tokyo, Japan

[73] Assignee: Pioneer Electronic Corporation, Tokyo, Japan

[21] Appl. No.: 246,471

[22] Filed: Sep. 19, 1988

[30] Foreign Application Priority Data

Sep. 17, 1987 [JP] Japan ........................... 62-140926[U]

[51] Int. Cl.[4] .......................... G02B 7/02; H04N 5/74

[52] U.S. Cl. .................................... 350/253; 358/231; 313/20

[58] Field of Search ............... 350/253, 252, 432, 610; 358/231, 237, 250; 313/36, 44, 20

[56] References Cited

U.S. PATENT DOCUMENTS

| | | | |
|---|---|---|---|
| 3,455,376 | 7/1969 | Beurtheret | 313/20 |
| 3,781,094 | 12/1973 | Griest | 350/610 |
| 3,884,558 | 5/1975 | Dunn, III et al. | 350/610 |
| 4,678,961 | 7/1987 | Comberg et al. | 313/36 |
| 4,725,755 | 2/1988 | Hasegawa | 358/250 |
| 4,737,678 | 4/1988 | Hasegawa | 358/250 |
| 4,777,532 | 10/1988 | Hasegawa | 358/231 |

*Primary Examiner*—Bruce Y. Arnold
*Assistant Examiner*—Loha Ben
*Attorney, Agent, or Firm*—Sughrue, Mion, Zinn, Macpeak & Seas

[57] ABSTRACT

A coupler contains cooling liquid between the front face of a projection tube and a lens that forms the screen of a projection television receiver. The coupler has a multiplicity of large and small fins extending into the cooling liquid and parallel to the center line of the tube to dissipate heat. The fins are closely spaced from each other.

5 Claims, 3 Drawing Sheets

PROJECTION APPARATUS FOR PROJECTION TELEVISION RECEIVER

BACKGROUND OF THE INVENTION

The present invention relates to a projection television receiver having three projection tubes for projecting red, green, and blue images, respectively, onto a common screen composed of a Fresnel lens or lenticular lens. More particularly, the invention relates to improvements in a coupler for filling cooling liquid between the lens and the front face of each projection tube.

Referring to FIG. 6, there is shown a conventional projection apparatus for use with a projection television receiver. The apparatus supports a projection tube 1. A cooling liquid is filled between the front face of the tube 1 and a lens 7. A metallic shield plate 3 is mounted on the side surface of the tube 1. Projections 1a are formed on the rear surface of the tube 1. A metallic presser plate 5 is pressed against each projection 1a via a resilient member 4.

A coupler 6 has a window on its front side. A lens 7 is mounted in the window. The coupler 6 is attached to the front face of the tube 1 via a packing 8. The presser plates 5 are provided with holes 5a into which screws 10 are inserted via springs 9, the holes 5a being spaced 90° from each other. The coupler 6 has four tapped holes spaced 90° from each other. The screws 10 are engaged in the tapped holes. The screws 10 are tightened to cause the springs 9 to press the coupler 6 against the front face of the tube 1. The packing 8 is used to seal the coupler 6 to the tube 1. The sealed inside of the coupler 6 between the lens 7 and the tube 1 is filled with cooling liquid to cool the image surface of the tube 1. Cooling fins are mounted on the outer surface of the liquid-holding portion of the coupler 6. The inner surface of the holding portion is smooth.

Accordingly, most of the light rays exiting the imaged surface of the projection tube 1 pass through the lens 7, but some rays impact the smooth inner surface of the coupler 6 and are reflected. As a result, a portion of the reflected light passes through the screen, thus creating a ghost.

Heat is dissipated into the cooling liquid, causing convection of the liquid. However, the flow of the liquid is irregular. Further, the surface area of the coupler 6 that can contact the liquid is limited because the inner surface of the coupler 6 is smooth. For these reasons, heat is not readily transmitted to the coupler 6 from the cooling liquid. Consequently, the tube is not cooled sufficiently.

SUMMARY OF THE INVENTION

In view of the foregoing difficulties with the prior art projection apparatus, it is an object of the invention to provide a projection apparatus which has a projection tube, a lens, and a coupler, and which prevents light reflected from the inner surface of the coupler, after emerging from the imaged surface of the tube, from directly reaching the lens thereby to prevent ghosts, and which regulates the convection due to a rise in temperature of the cooling liquid, the inner surface of the coupler having a large area to effectively transmit heat from the cooling liquid to the coupler for effective cooling.

The above object is achieved by the provision of corrugation means including a plurality of fins extending parallel to the center line of the projection tube and formed on the inner surface of the coupler which receives the cooling liquid between the lens and the front face of the tube.

DESCRIPTION OF THE PREFERRED EMBODIMENTS

Figure 1:
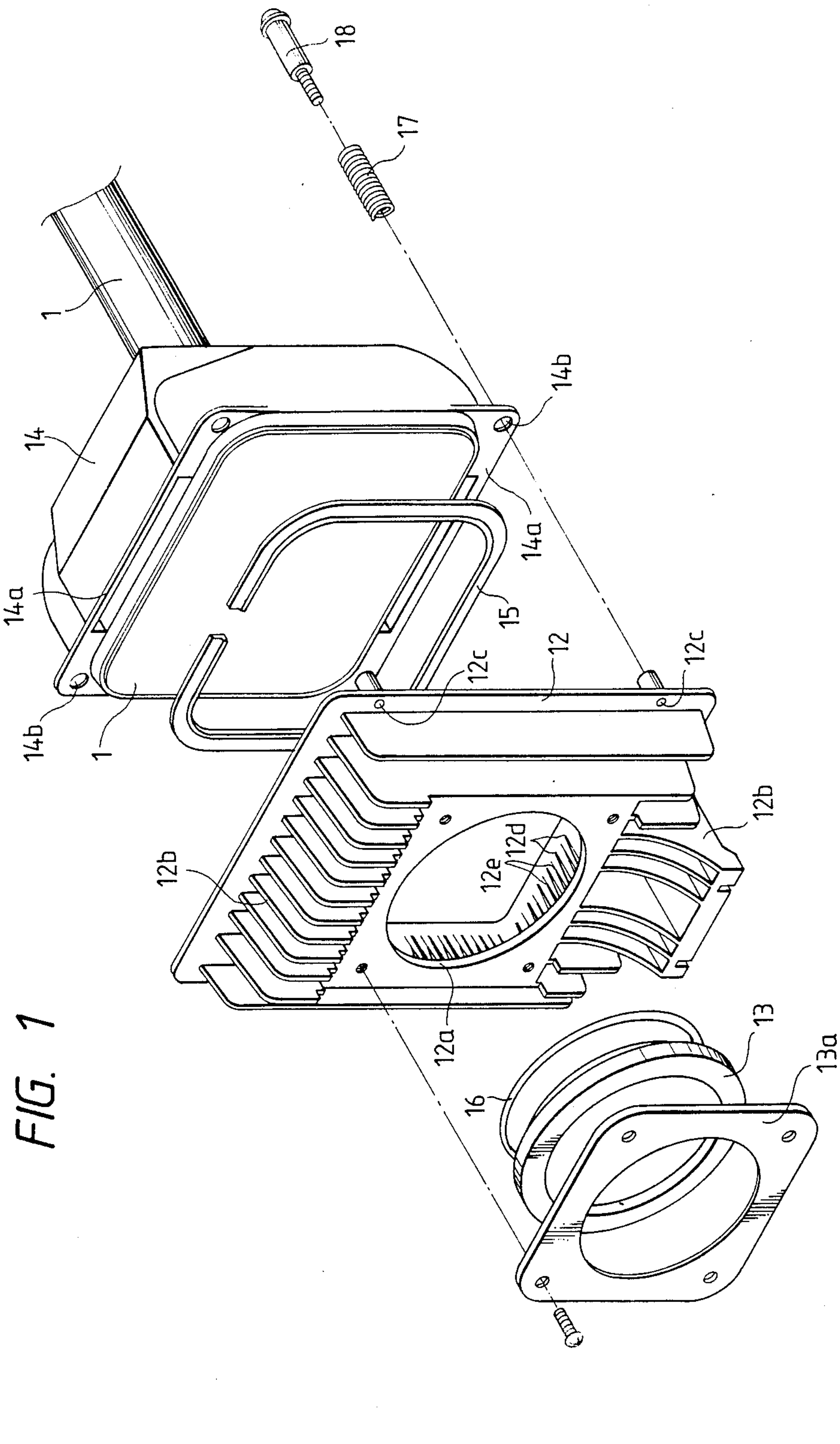
FIG. 1 is an exploded perspective view of a projection apparatus according to the invention.

Referring to FIGS. 1 to 5, there is shown a projection apparatus embodying the concept of the invention. This apparatus includes a projection tube 1 and a coupler 12 die-cast in aluminum. The coupler 12 is used to mount the tube 1 to a frame (not shown) inside a projection television receiver for holding the tube 1 to the receiver. The coupler 12 has a window 12a on its front side. A lens 13 is interposed between a mounting plate 13a and a ring of packing 16. The plate 13a is mounted around the window 12a. Heat-dissipating fins 12b are formed on the upper and lower outer surfaces of the coupler.

A cover 14 that is die-cast in zinc is fitted over the projection tube 1, and extends from about the top of the tube 1 to the vicinity of the deflecting coil, i.e., it covers the rear surface of the tube. Upper and lower flanges 14a are formed on the cover 14. Holes 14b are formed in each flange 14a near its both ends. Therefore, the horizontal positions of the holes 14b lie within the horizontal extent of the front face of the tube 1.

The coupler 12 bears against the front face of the projection tube 1 via packing 15. A screw 18 is inserted into a spring 17, and passed through each hole 14b. The front end of the screw 18 is screwed to the corresponding tapped hole 12c in the coupler 12.

As the screw 18 is tightened, the spring 17 presses the coupler 12 against the front face of the tube 1 via the packing 15. Then, the sealing packing 16 and the lens 13 are mounted to the coupler 12 by means of the mounting plate 13a.

Figure 3:
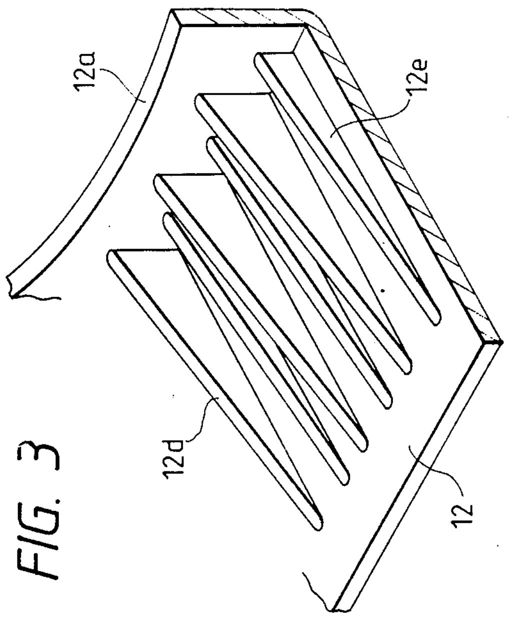
FIG. 3 is a perspective view of the fins shown in FIG. 2.
Figure 2:
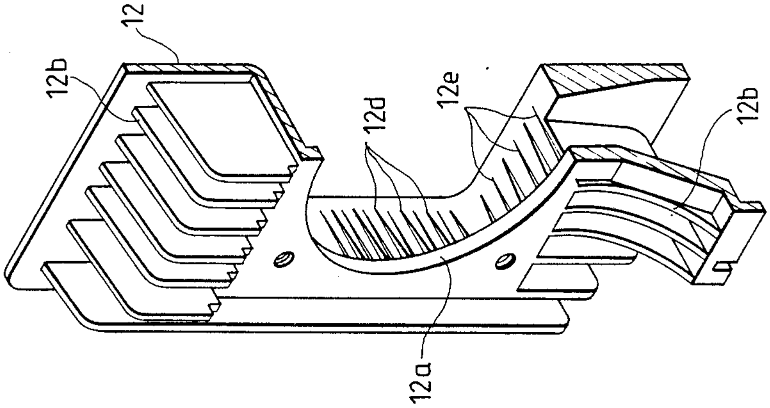
FIG. 2 is a perspective view of the coupler shown in FIG. 1.
Figure 6:
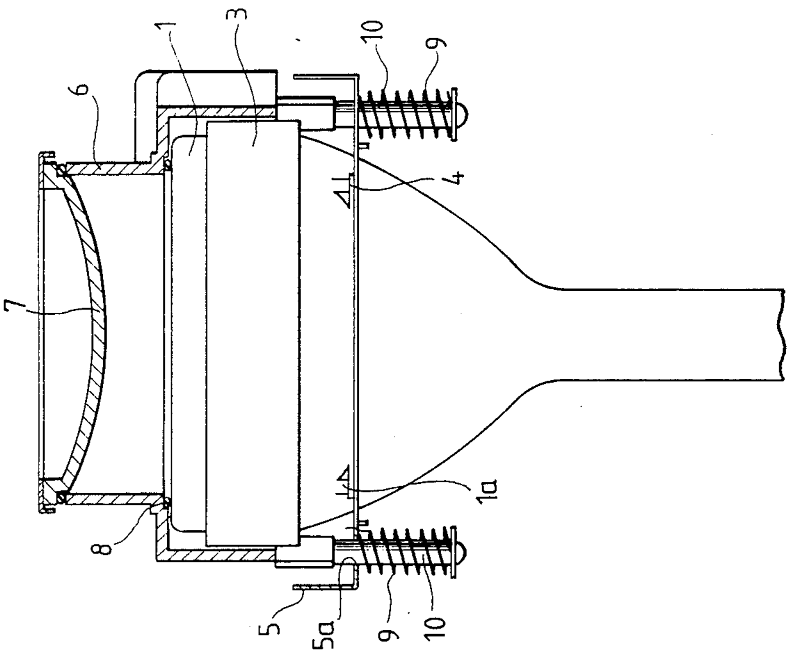
FIG. 6 PRIOR ART
FIG. 6 is a plan view partially in cross-section of a conventional projection apparatus.

The space between the lens 13 in the coupler 12 and the front face of the projection tube 1 is filled with cooling liquid. The wall of the coupler which forms this space has large fins 12d and small fins 12e, as shown in FIGS. 2 and 3. These fins are made to extend parallel to the center line of the tube 1 to facilitate drawing dies after the coupler 12 is die-cast. Two sizes of fins are employed and these fins are spaced closely together so as to scatter or absorb light rays more effectively.

The coupler 12 can be molded if desired. In addition, the numbers of the fins 12d and 12e can be increased.

Figure 5:
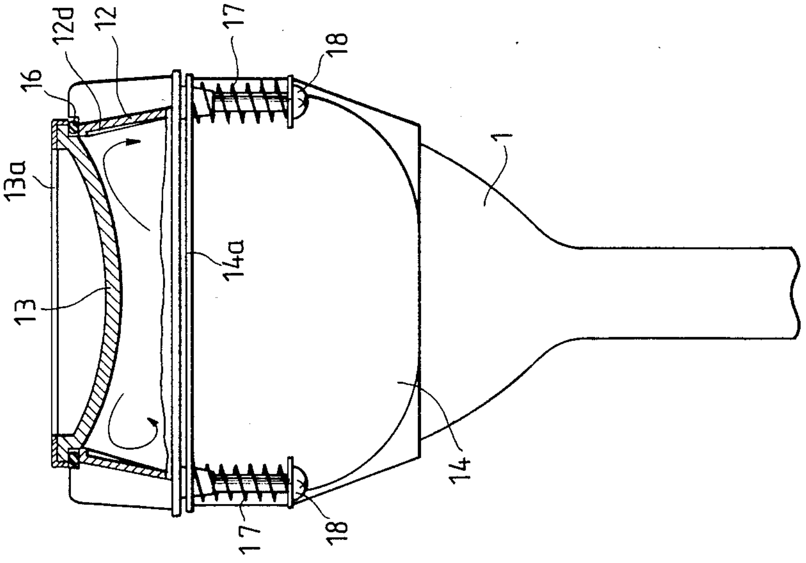
FIG. 5 is a partially cut-away plan view of the apparatus shown in FIG. 1 in which the apparatus has been assembled and which shows convection caused by generation of heat.

When the cooling liquid is heated, convection occurs. This flow is regulated and smoothed by the fins **12*d* and 12*e* as shown in FIG. 5**.

The increased inner surface area of the coupler 12 in contact with the cooling liquid is coupled with the smooth convection of the cooling liquid, thus attaining effective heat transfer to the coupler 12. Then, heat is dissipated from the fins **12*b***.

Figure 4:
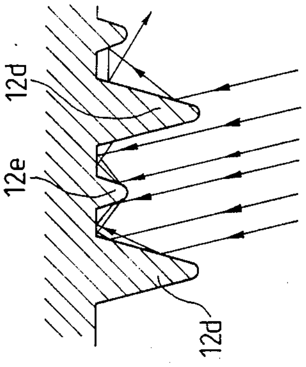
FIG. 4 is a fragmentary cross-section of the coupler shown in FIGS. 1–3 for illustrating the manner in which light is reflected off the fins.

Some of the light emitted from the imaged surface of the projection tube 1 falls on the inner surface of the coupler 12 as indicated by the arrows of FIG. 4. However, only a small amount of the light is reflected directly toward the lens 13 because of the presence of the fins **12*d* and 12*e*. Since the light is reflected back and forth among the fins 12*d* and 12*e*, it is attenuated. The cooling liquid is diffused by the large fins 12*d* and is absorbed by the small fins 12*e*. Accordingly, the cooling efficiency is improved. Consequently, ghosts which would have been caused heretofore by reflection off the inner surface of the coupler 12**, are prevented.

As described thus far, in accordance with the invention, the fins formed on the inner surfaces of the coupler receiving cooling liquid regulate the convection of the liquid and smooth the flow. The increased inner surface of the coupler provides an increased heat-dissipating area. These features are combined together to transfer heat rapidly from the cooling liquid to the coupler, thus enhancing the cooling effect. Also, the amount of light which emerges from the imaged surface of the projection tube, is reflected off the inner surface of the coupler, and directly reaches the lens, decreases, thus preventing ghosts from appearing on the screen.

What is claimed is:

1. A projection apparatus for use with a projection television receiver, comprising:

a projection tube;

a coupler having a front face provided with a window;

a lens mounted in a window;

packing sandwiched between the whole outer periphery of a front face of the projection tube and the coupler;

cooling liquid that fills a confined space between the lens and the front face of the projection tube; and corrugation means formed on an inner surface of the coupler which defines one wall of the confined space.

2. The projection apparatus of claim 1, wherein said corrugation means includes fins extending parallel to the center line of the projection tube.

3. The projection apparatus of claim 2, wherein said fins are closely spaced from each other.

4. The projection apparatus of claim 2, wherein some of said fins are larger than others of said fins.

5. The projection apparatus of claim 4, wherein the larger and smaller fins are arranged alternately.

* * * * *